United States Patent [19]

Watanabe

[11] 4,286,789

[45] Sep. 1, 1981

[54] SIMPLIFIED RECORD PLAYER

[75] Inventor: Katsumi Watanabe, Kawasaki, Japan

[73] Assignee: Yugen Kaisha Watanabe Kenkyusho, Kanagawa, Japan

[21] Appl. No.: 95,157

[22] Filed: Nov. 19, 1979

[30] Foreign Application Priority Data

Nov. 9, 1978 [JP] Japan ................................ 53-147524

[51] Int. Cl.³ .............................................. G11B 17/00
[52] U.S. Cl. ...................................... 369/244; 369/31; 369/67
[58] Field of Search .................... 274/15 R, 1 A, 9 R, 274/9 RA; 274/10 S

[56] References Cited

U.S. PATENT DOCUMENTS

| | | | |
|---|---|---|---|
| 3,383,114 | 5/1968 | Ryan | 274/9 RA |
| 4,022,478 | 5/1977 | Stewart | 274/10 S |
| 4,150,831 | 4/1979 | Watanabe | 274/10 S |

Primary Examiner—Harry N. Haroian
Attorney, Agent, or Firm—Basile, Weintraub & Hanlon

[57] ABSTRACT

A simplified record player constructed such that the driving force from a motor is transmitted through a drive shaft to a tubular shaft which is capable of being coupled to the drive shaft so as to be rotated therewith, but only in the direction of rotation. The tubular shaft is normally biased in an axial direction away from the drive shaft. The tubular shaft has facing downwardly a directed stepped portion formed at its outer periphery. A latch shaft having an upper end face, an annular flange formed at its outer periphery and an upwardly facing stepped portion is fitted about the periphery of the tubular shaft. A coil spring supported by a washer is disposed around the tubular shaft and urges the latch shaft at the flange such that the stepped portion of the latch shaft abuts against the stepped portion of the tubular shaft. A push button is mounted to the top of the tubular shaft and includes within its interior a plurality of roller-type record retaining pieces. The retaining pieces are resiliently and partially projected from the interior of the push button toward the outside so as to clamp a record disc. A latch piece is swingably attached to the record player housing and is normally biased toward the axis of the shaft assembly such that it engages the latch shaft flange when the push button is not pushed down and acts to prevent the tubular shaft and the latch shaft from separating.

7 Claims, 3 Drawing Figures

SIMPLIFIED RECORD PLAYER

BACKGROUND OF THE INVENTION

I. Field of the Invention

This invention relates to a simplified record player, and more particularly, to a record player wherein a record disc is integrally connected to a drive shaft in both an axial and a rotational direction by a one touch motion of a push button, which is mounted on the top of the drive shaft, and wherein a reproduction stylus is upwardly directed and a tone arm carrying the stylus is positioned under the record disc such that the tone arm can be protected by the record disc during its sound reproduction.

II. Description of the Prior Art

The prior art has developed simplified record players. See inter alia, Japanese Patent Applicaton No. 62390/77 published as a Japanese Patent Laid-Open Publication No. 147501/78 and U.S. Pat. No. 4,150,831.

Although the prior art record players are efficacious there still exists some areas which need improvement. It has been observed that an uneven rotation of a record disc, which was caused by even a very slight deviation in the parallelism of the held record disc, correlated with a stylus pressure. To solve the problem it was found that the record disc must be tightly fitted around a push button and that engagement by a reproduction stylus with the record disc must be cushioned in a suitable manner.

It was, also, found that a laterally acting metal spring used for biasing an actuating link which releases a latch piece which, in turn, holds the push button in position relied on manual setting during assembly. But, the manual setting of the latch piece results in it potentially being out of position, and, therefore, improvements have been desired with respect to both production efficiency and durability of the products.

OBJECTS OF THE INVENTION

An object of the present invention is to reduce the deviation in the horizontal holding of the record disc as much as possible.

Another object of the present invention is to provide a simplified record player which maintains smooth rotation irrespective of any slight deviation in the horizontal holding of the record disc.

A further object of the present invention is to provide a record player of simplifed construction.

A still further object of the present invention is to eliminate a laterally acting spring which is liable to be mis-positioned during assembly and thereby to reduce the man-hours required for assembly.

SUMMARY OF THE INVENTION

In accordance herewith a toy record player comprises a shaft member assembly comprising a drive shaft, a tubular shaft telescopically connected to the drive shaft and a latch shaft fitted to the outer periphery of the tubular shaft and which supports the tubular shaft at a stepped portion thereof.

The latch shaft, which has a flange and an end face, is fitted about the outer periphery of the tubular shaft and supports a push button. The latch shaft is resiliently urged by spring means to maintain the flange and the end face at a desired position with respect to the tubular shaft.

A record disc is fitted around the push button which, in turn, is connected through the shaft member assembly to the drive shaft. Thereby the record disc can be rotated by a mere depression of the push button.

The present invention enables a record disc to be firmly secured and a suitable pressure to be imparted thereto by a reproduction stylus during engagement between the stylus and the disc. In other words a stylus can be adequately cushioned such that uneven rotation of the record disc due to variation in stylus pressure can be eliminated. To achieve this, a roller type record retaining piece is resiliently urged radially and outwardly by an actuating disc aided by a spring, both disposed interiorly of the push button.

By virtue of the circular periphery of the roller-type record retaining piece combined with the spring to resiliently urge the record retaining piece, the record disc, when playing, can be relieved or cushioned from excessively high stylus pressure.

A latch piece is disposed on the housing of the record player and maintains the push button in an engagement position or releases it from the engagement position by resting either on the end face or on the flange portion of the latch shaft.

The record disc engages with the reproduction stylus when the latch piece rests on the end face of the latch shaft. At this position the latch shaft is resiliently cushioned by the spring.

By virtue of this construction, if deviation in the horizontal holding of the record disc exists, excessive stylus force due to such deviation is absorbed by the spring means. Hence, rotation of the record disc is always smooth and uniform.

Also, by employing a spring urged support, any extreme fine adjustment required for the stroke of the push button relative to the position where the reproduction stylus engages with the record disc is eliminated. This facilitates production.

Also, each of the actuating links which release the latch piece from the end face of the latch shaft is resiliently urged by an arch-shaped integrally fixed spring in the return direction. Accordingly, no particular setting is required and, thus, many man-hours can be saved in production.

For a more complete understanding of the present invention reference is made to the following detailed description and accompanying drawing. In the drawing like reference characters refer to like parts throughout the several views in which:

DETAILED DESCRIPTION OF THE PREFERRRED EMBODIMENTS

Figure 1:
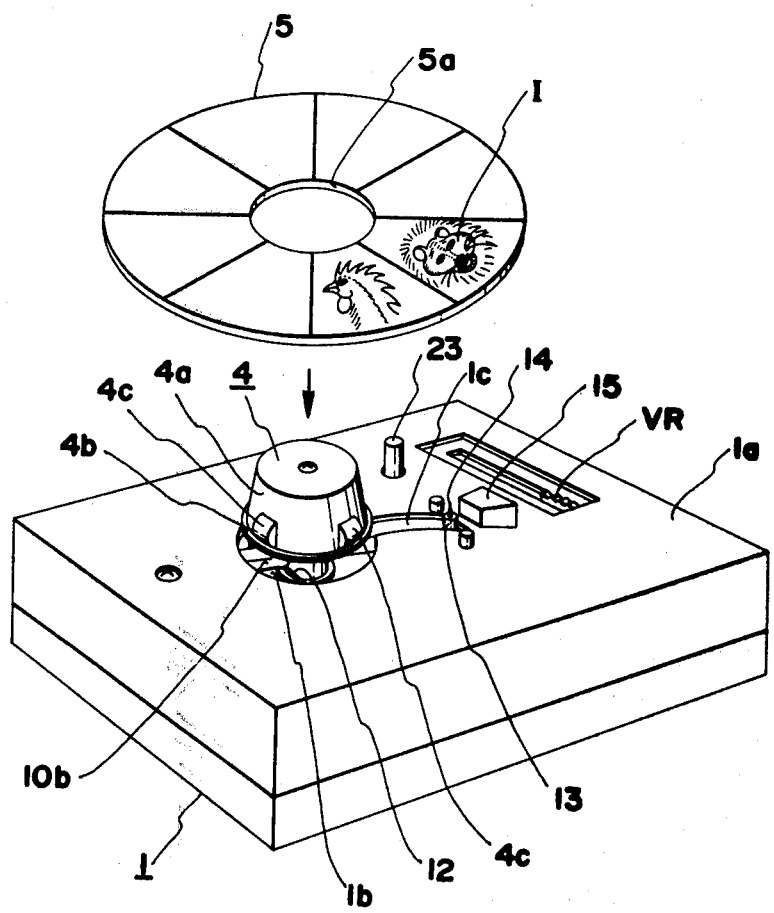
FIG. 1 is a perspective view showing a record player of the present invention.

Referring to the drawing, and as shown in FIG. 1 a record player of the present invention, has a cover 1a. The cover 1a is tightly mounted on a housing 1. Formed on the upper surface of the cover 1a are a button hole 1b and a guiding slot 1c which merges into the button hole 1b for guiding revolutional movement of a reproduction stylus 14.

As shown in the drawing a push button 4 and the reproduction stylus 14, which is mounted on a pivotally supported tone arm 13, pass through the button hole 1b and the guiding slot 1c, respectively.

A stylus point 15 is disposed closely adjacent to the outermost end of the guide slot 1c such that it is able to guide the outer periphery of a record disc 5, and also to set a desired index symbol I to align the point when the record disc 5 is fitted to the push button 4, with the inner periphery of its central bore 5a being placed around the outer periphery of the push button 4.

Figure 2:
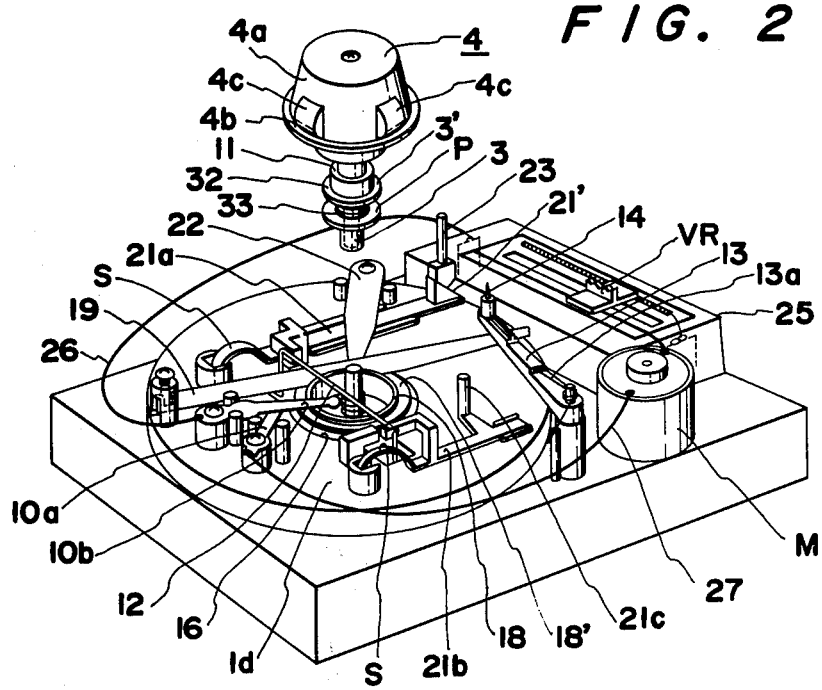
FIG. 2 is a perspective view of the record player as shown in FIG. 1, with its cover being removed.
Figure 3:
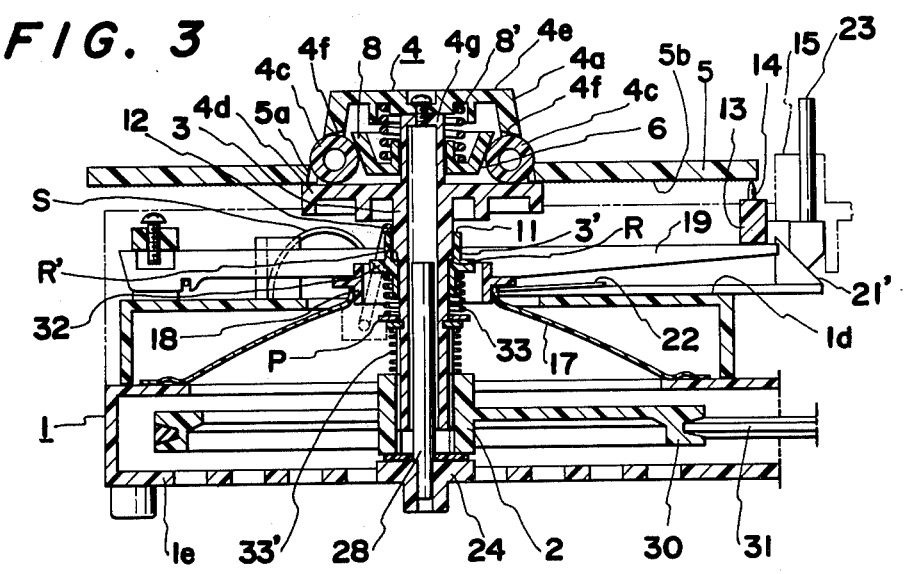
FIG. 3 is an elevational view, partly in section, showing the interior of a housing, principally with respect to the construction of the push button used herein.

Referring, now, to FIGS. 2 and 3 the housing 1 carries thereon an intermediate or carrier deck 1d on which is assembled an intermediate mechanism necessary for reproducing sounds recorded on the record disc.

At the central portion of the intermediate deck or plate 1d there is, also, formed an opening which defines a communication hole 16 through which a vibration core 18 of a speaker 17 extends upwardy above the level of the intermediate plate 1d.

The vibration core 18 is of a tubular form and comprises a flange 18'. A shaft member assembly which carries the push button 4 is inserted through the vibration core 18.

The shaft member assembly comprises a drive shaft 2 and a tubular shaft 3 integrally telescopically connected to the drive shaft 2. The shaft 3 is movable in a direction of rotation with the drive shaft 2. A latch shaft 3' is fitted about the outer periphery of the tubular shaft 3 to support the tubular shaft.

The push button 4 is normally biased upward by a spring as explained below.

A sound transmitting bar 19 is disposed and carried on the intermediate plate 1d. The bar 19 defines a cantilever which crosses the communication hole 16. The sound transmitting bar 19 is mounted on the flange 18'. As shown in FIG. 3, the flange 18' is normally raised upward by a spring 22.

On the upper face of the intermediate plate 1d, the tone arm 13 is swingably or pivotally mounted and extends along the upper face of the intermediate plate 1d. The tone arm is mounted such that it can swing slightly up and down.

The lower face of the tone arm 13 slidably contacts the sound transmitting bar 19 and is supported thereby.

By virtue of this construction, a vibration picked up by the reproducing stylus 14 is first transmitted to the sound transmitting bar 19 while the tone arm 13 swivels under sliding contact with respect to the sound transmitting bar or member 19. From the bar 19 the vibration is transmitted further to the vibration core 18. The vibration is then amplified by the speaker 17 into an audible sound or voice.

The tone arm 13 is, also, supported upwardly by the spring 22 through the sound transmitting bar 19.

The latch shaft 3' is fitted about the outer periphery of the tubular shaft 3. The latch shaft 3' includes a radial flange 32, the purpose of which is detailed subsequently.

The tubular shaft 3 has a washer P fixed with respect to the axial direction. A coil spring 33 is supported on the washer P. The spring 33 bears against the flange 32, thus, normally urging the latch shaft 3' upwardly.

As can be seen from FIG. 3, the latch shaft 3' is movable in an axial direction. An upwardly facing step R' is formed on the latch shaft 3' and engages a downwardly facing mating step R formed on the outer periphery of the tubular shaft 3. Mating steps R and R' limit upward movement of latch shaft 3' such that both the flange 32 and an upper end 11 of the latch shaft 3' take a predetermined position on the periphery of the tubular shaft 3.

As can be seen from FIGS. 2 and 3 an inverted U-shaped latch piece 12 is pivotally attached on the intermediate plate 1d in a direction normal to the tubular shaft 3.

Two plastic substantially similar actuating links 21a and 21b are mounted on the plate 1d. The links are slidable with respect to the latch piece 12. The link 21a is for manual use. One axial end of the link 21a correlates with a manual switch lever 23 through an inclined wedge face 21' attached to the end of the actuating link 21a. The opposite end of the link 21a has an arch shaped spring S, a free end of which is sustained on the intermediate plate 1d to normally bias the actuating link 21a toward the manual switch lever 23.

The manual switch lever 23 projects above the cover 1a over the housing 1. Depression of the switch lever 23 renders the actuating link 21a to push the latch piece 12 away from the periphery of the tubular shaft 3.

The other actuating link 21b is provided for automatic resetting and normally holds and biases the latch piece 12 towards the tubular shaft 3. One end of the link 21b, also, has an integrally formed spring S which biases both the actuating link 21b and the latch piece 12 connected thereto.

The actuating link 21b has an upright projection 21c which moves toward a point on the orbit of the revolution of the tone arm 13 corresponding to the terminal point of sound reproduction.

Accordingly, during play when the tone arm 13 approaches the terminal point of sound reproduction, the tone arm 13 acts to push the projection 21c to move both the actuating link 21b and the latch piece 12 away from the outer periphery of the tubular shaft 3. The tone arm 13 in this manner, is positioned upon its arrival at the terminal point to be able to urge the latch piece 12 through the actuating link 21b.

A wire spring 13a returns the tone arm 13 to a starting point of sound reproduction.

Switch contacts 10a and 10b, both disposed below the push button 4' are normally vertically spaced apart from each other. Accordingly, when the push button 4 is lowered by a depression the switch contact 10a is depressed down to contact with the contact 10b. A motor M, mounted on the housing 1, is connected to lead wires 26, 27 stemming from a battery in a battery magazine 25 via the switch contacts 10a and 10b. A variable resistor VR adjusts the rotating speed of the motor M.

In FIG. 3, the speaker 17 is shown as being mounted under the intermediate plate 1d, with its divergent end directed downwards, and the vibration core 18, which is of cylindrical configuration, formed on the converging end of the speaker 17 projects upwardly through the central communication hole 16 defined in the intermediate plate 1d.

A boss 24 is provided on the bottom plate 1e of the housing 1. A center pin 28 extends to an intermediate height of the housing 1 and is received at its lower end by a central bore defined in the boss 24. The short tubular driving shaft 2 is mounted on the boss 24 of the bottom plate 1e of the housing 1 and is freely, rotatably, journally received through the center pin 28.

The driving shaft 2 carries a large diameter pulley 30 therearound. A belt 31 extends between the motor M and the pulley 30. The belt 31 reduces the rotating speed of the turn table.

The tubular shaft 3 is inserted into the central bore of the drive shaft 2. The shaft 3 is capable of being rotated integral with the driving shaft 2.

The center pin 28 is inserted in up to the intermediate depth of the central bore of the tubular shaft 3 so as to support the tubular shaft 3 coaxially with the driving shaft 2.

A coil spring 33′ having a smaller diameter than that of the coil spring 33 is resiliently interposed between the upper end face of the driving shaft 2 and the washer P of the tubular shaft 3. Hence, the tubular shaft 3 is normally upwardly biased.

In the drawing, the latch piece 12 is shown in a positon where the push button 4 is depressed and the upper end face 11 of the latch shaft 3′ reaches and engages with the latch piece 12. In this position the tubular shaft 3 is latched, thus, maintaining the push button 4 in its downward position.

An upper peripheral rim 4b of the bottom plate 4d of the push button 4 defines a supporting face for the record disc 5. A hollow frustoconical cover 4e is mounted on the bottom plate 4d.

A peripheral side surface of the hollow cover 4e comprises a rotatable peripheral surface 4a around which the record disc 5 is guided and mounted concentrically with the driving shaft 2.

Windows 4f communicate with the interior of the cover 4e and are formed on the rotatable peripheral surface 4a. Preferably four windows, quarterly divided and at equally allotted positions are employed.

Into each window a roller shaped record retaining piece 4c is inserted from the interior of the push button 4 and is retained such that the peripheral surface of each record retaining piece 4c partly protrudes radially outwardly along the upper peripheral rim 4b.

An upright guide stem 4g is disposed at the center of the bottom plate 4d. The hollow frustoconical cover 4e is tightly secured by a screw to the upper end of the guide stem 4g. An actuating disc 8 of inverted hollow frustoconical configuration and having a tapered side peripheral face 6 is slidably fitted about the guide stem 4g and is capable of being guided to move freely along the guide stem 4g.

The actuating disc or piece 8 is normally biased downwardly by a coil spring 8′, whereby each record retaining piece 4c is normally biased radially and outwardly by means of the tapered face 6 of the actuating piece 8 along the supporting face 4b.

In operation the record disc 5 is fitted around the push button 4 with its record grooves 5b faced downwardly wherein the peripheral rim of the central bore 5a is clamped between the record retaining piece 4e and the supporting face 4b.

As shown in FIG. 1 suitable index symbols and/or pictures I are placed to indicate each initial point corresponding to reproduction groove 5b in the lower face of the record disc 5. This enables the fitting of the record groove on the push button 4 to be done by setting a stylus point 15 to face or align with the index symbol I.

Subsequent depression of the push button 4 permits the record groove 5b of the record disc to engage the reproduction stylus 14, and at the same time, switch contacts 10a and 10b contact each other to establish an electric circuit to energize motor M to rotate the push button 4.

The tubular shaft 3, also, lowers. Then the latch piece 12, which has been resiliently urged against the periphery of the latch shaft 3′, is urged into engagement with the upper end face 11 such that the entire push button assembly is locked and prevented from its upward return movement without disturbing rotation of the push button 4 or the tubular shaft 3.

Thus, the push button 4 continues rotating while it is still holding the record disc and keeping the recording groove 5b in engagement with the reproduction stylus 14.

Rotation of the record disc 5 guides the reproduction stylus and the tone arm 13 together up to the terminal point of sound reproduction, where the tone arm pushes the projection 21c of the actuating link 21b. Then, the action of actuating link 21b enables the latch piece 12 to escape from engagement with the upper end portion 11 of the latch shaft 3′. Consequently, the tubular shaft 3 is released from locking and is able to revert, by the resilient force of the coil spring 33′, to its position prior to being lowered by depression of the push button 4.

At this time, the two mating contacts 10a and 10b of the switch part away from each other and the motor M stops rotation due to the breakage of the circuit. Also, the record disc 5 moves upward to release the reproduction stylus from engagement with the record groove. Now, the tone arm 13 returns back to the starting point of sound reproduction by the action of the spring 13a.

When it is desired to stop sound reproduction partially through playing, depression of the manual switch rod will disengage the latch piece by means of the actuating link 21a and, thus, the push button and the record disc are lifted upward resulting in simultaneous disengagement of the reproduction stylus from the record disc.

As explained above, the stylus force imparted on the record disc of the present invention can be adjusted by means of the latch shaft begin urged by a spring. Consequently, slight deviation in the parallel holding of the record disc with respect to the surface of the record disc will not result in any appreciable uneven rotation of the record disc due to poor uniformity in the stylus force which accompanies poor sound reproduction.

Having, thus, described the invention what is claimed is:

1. In a simplified record player of the type which comprises a normally upwardly biased push button which defines means for holding a record disc, the record disc being lowered by depression of the push button such that the lower face of the disc, having reproducing grooves, engages with an upwardly projecting reproduction stylus carried by the record player; a latch shaft having an upwardly facing end face for latching a latch piece, the latch piece being normally biased toward the outer periphery of the latch shaft such that the push button and the record disc are maintained together in a depressed state, and actuating link means which pushes the latch piece so as to release it from engagement with the latch shaft thereby permitting the push button and record disc to return to their initial position, the improvement which comprises:

an upwardly extending shaft member assembly including (a) a drive shaft, (b) a tubular shaft telescopically coupled to said drive shaft so as to be rotated integrally with the drive shaft only in a direction of rotation, (c) a latch shaft fitted around the outer periphery of the tubular shaft; the tubular shaft having a downwardly facing stepped portion formed on the outer periphery thereof; the latch shaft having a flange and an upper end face formed at a predetermined space thereon, the flange and upper end face each acting as a latch face, the latch shaft having an upwardly facing stepped portion formed interiorly thereof; a first spring means resiliently biasing the tubular shaft such that the tubular shaft is supported at the downwardly facing stepped portion by the upwardly facing stepped portion of the latch shaft, and a second spring means resiliently biasing the latch shaft such that the latch shaft is supported upwardly under resilient force imparted by the second spring means.

2. The improvement of claim 1 wherein:
the push button for holding said record disc includes a plurality of record retaining pieces which retain and secure the record disc at the inner peripheral rim of the center hole of said record disc.

3. The improvement of claim 2 wherein:
(a) the push button has a hollow interior,
(b) the retaining pieces are roller shaped, the retaining pieces being resilient and partly protrude from the interior of the push button.

4. The improvement of claim 1 wherein:
the push button defines a push button switch for establishing or breaking an electric circuit for driving the record disc.

5. The improvement of claim 1 which further comprises:
an arch-shaped spring which biases the actuating link means to urge the latch piece against the periphery of the shaft member assembly.

6. The improvement of claim 1 wherein:
the actuating link is fabricated from a plastic.

7. The improvement of claim 1 wherein:
the spring means is disposed around the tubular shaft.

* * * * *